United States Patent
Palviainen

(10) Patent No.: US 7,139,558 B1
(45) Date of Patent: Nov. 21, 2006

(54) ROUTING OF CALL FORWARDING ACCORDING TO BASIC SERVICES

(75) Inventor: Keijo Palviainen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 401 days.

(21) Appl. No.: 09/446,508

(22) PCT Filed: Jun. 22, 1998

(86) PCT No.: PCT/FI98/00545

§ 371 (c)(1),
(2), (4) Date: Dec. 27, 1999

(87) PCT Pub. No.: WO99/01004

PCT Pub. Date: Jan. 7, 1999

(30) Foreign Application Priority Data

Jun. 27, 1997 (FI) .................................... 972789

(51) Int. Cl.
*H04M 3/42* (2006.01)
(52) U.S. Cl. .................. 455/417; 455/433; 455/435.1; 455/445
(58) Field of Classification Search ............... 455/414, 455/417, 432, 433, 459, 461
See application file for complete search history.

(56) References Cited

U.S. PATENT DOCUMENTS

| | | | | |
|---|---|---|---|---|
| 5,388,095 A | * | 2/1995 | Seraj | 370/384 |
| 6,134,220 A | * | 10/2000 | Le Strat et al. | 370/252 |
| 6,134,433 A | * | 10/2000 | Joong et al. | 455/417 |
| 6,519,248 B1 | * | 2/2003 | Valko | 370/352 |

FOREIGN PATENT DOCUMENTS

| | | |
|---|---|---|
| FI | 953917 A | 2/1997 |
| FI | 955331 A | 5/1997 |
| WO | 93/20641 | 10/1993 |
| WO | 95/20299 | 7/1995 |
| WO | 95/31076 | 11/1995 |
| WO | 97/07643 | 2/1997 |
| WO | 98/17816 | 5/1997 |
| WO | 98/26621 | 6/1998 |

OTHER PUBLICATIONS

Michel Mouly and Marie-Bernadette Pautet, The GSM System for Mobile Communications, pp. 1-699, (1992), no month listed.

* cited by examiner

*Primary Examiner*—Temica Beamer
(74) *Attorney, Agent, or Firm*—Pillsbury Winthrop Shaw Pittman LLP

(57) ABSTRACT

A method and equipment for implementing call forwarding in a mobile system having at least one forwarding exchange and at least one subscriber database is provided so that routing of a forwarded call can be implemented. The forwarding exchange can receive a call addressed to a subscriber in the mobile system. A subscriber data request can be performed to a subscriber database connected to the forwarding exchange. A response message containing data the call forwarding and a forwarding number can be transmitted from the subscriber database to the forwarding exchange. Basic service data indicating basic service related to the call can be transmitted from the subscriber database to the forwarding exchange in connection with the response message. A basic service code is derived the service data and the call can be transferred to the forwarding number. The routing can be arranged according to the basic service code.

22 Claims, 6 Drawing Sheets

Fig. 5

```
SendRoutingInfoResE ::= SEQUENCE (
imsi                              IMSI,
routingInfo                       RoutingInfo,
cug-CheckInfo                     CUG-CheckInfo          OPTIONAL,
pni                               PnpIndex               OPTIONAL,
sriResExtension    [PRIVATE 0]    SriResExtension        OPTIONAL,
ansiSriResExt      [PRIVATE 30]   ANSISriResExt          OPTIONAL
...)
```

```
SriResExtension ::= [PRIVATE 0] SEQUENCE (
inTriggerKey       [0]    InTriggerKey              OPTIONAL,
vlrNumber          [1]    ISDN-AddressString        OPTIONAL,
activeSs           [2]    ActiveSS-List             OPTIONAL,
traceReference     [3]    TraceReference            OPTIONAL,
traceType          [4]    TraceType                 OPTIONAL,
omc-Id             [5]    AddressString             OPTIONAL,
hotBilling         [6]    BOOLEAN                   OPTIONAL,
cfoIsDone          [7]    BOOLEAN                   OPTIONAL,
cfInCug            [8]    BOOLEAN                   OPTIONAL,
basicService       [9]    BasicServiceCode          OPTIONAL,
category           [10]   Category                  OPTIONAL,
routingCategory    [11]   RoutingCategory           OPTIONAL,
pnpIndex           [12]   PnpIndex                  OPTIONAL,
nokia-CUG          [13]   Nokia-CUG-Data            OPTIONAL,
noBarrings         [14]   NULL                      OPTIONAL,
odb-Data           [15]   ODB-Data                  OPTIONAL
...)
```

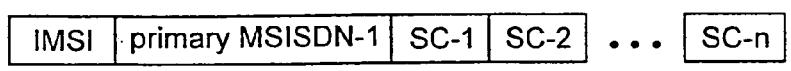

Fig. 7

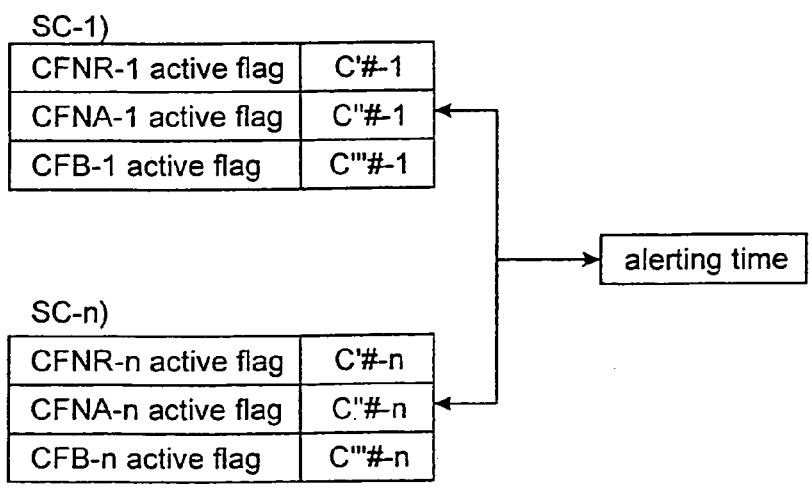

ROUTING OF CALL FORWARDING ACCORDING TO BASIC SERVICES

This application is the national phase of international application PCT/FI98/00545 filed Jun. 22, 1998 which designated the U.S.

BACKGROUND OF THE INVENTION

The invention relates to telecommunication systems and especially to a method and equipment for implementing call forwarding in a mobile system comprising at least one forwarding exchange for carrying out call forwarding on the basis of subscriber data related to the call forwarding, and at least one subscriber database for storing the subscriber data related to the call forwarding. The method comprises the steps of receiving at the forwarding exchange a call addressed to a subscriber in the mobile system, performing a subscriber data request to the subscriber database, and transmitting a response message from the subscriber database to the forwarding exchange, the message containing data indicating the call forwarding and a forwarding number.

Modern mobile systems provide subscribers with different data transmission properties in addition to conventional speech transmission. Mobile system services can be divided generally into teleservices and bearer services. A bearer service is a telecommunication service that constitutes the transmission of signals between user-network interfaces. For example modem services are bearer services. In a teleservice, the network also provides terminal services. Important teleservices in turn include speech, facsimile and videotex services.

One mobile subscriber may typically have access to different tele- and bearer services that are referred to in this connection as basic services. A subscriber may use for example a speech, facsimile and data service. A call terminating at or originating from a mobile station may therefore require any of these basic services, and therefore the correct service must be indicated to the mobile network. For example in a GSM mobile system, call set-up signalling transmitted by a mobile station contains data about the required basic service in a bearer capability information element (BCIE). In this manner, the mobile network is able to select the correct basic service for calls originating from the mobile station. Calls arriving from an integrated services data network (ISDN) also contain a corresponding information element that indicates the required service. However, if the call arrives from a public switched telephone network (PSTN) or travels through it, the mobile network does not receive such data concerning the service type of the call. In such a case, the mobile network should know in some other manner the type of basic service required by the call.

A known solution to this problem is a multi numbering scheme, here a mobile subscriber has as many numbers as he has services to which he wants to receive incoming calls. The number is also called the mobile subscriber ISDN number, i.e. MSISDN. For example, a subscriber may have a number for a speech service, a facsimile service and a modem service. In a multi numbering scheme, the calling subscriber selects from the mobile subscriber's numbers the one corresponding to the desired service.

An additional service in mobile systems is call forwarding that may be activated by a subscriber. Call forwarding may be unconditional, in which case a call is always transferred to the new number given. Call forwarding may also be set to be conditional, for example when the subscriber is busy, does not respond or cannot be reached. Due to the multi numbering scheme, the subscriber may transfer different types of calls addressed to him to different numbers. However, this requires that the subscriber determines the basic service to which the forwarding is directed in connection with the activation of the forwarding. If no basic service is determined, all subscriber calls are transferred to the same number. When the subscriber determines the forwarding specifically for each basic service, he has to activate the forwarding several times and to manage separately the set of numbers related to each service, the activated forwarding procedures etc. The management of such functions requires that the users are well trained, which consumes resources. There is also the danger that functions that are found to be difficult are not used.

One of the most common forms of call forwarding is the voice mail service where a subscriber directs the received calls to be transferred, either unconditionally or conditionally, to a voice mail service centre (VMS) that attends to responding to the calls and that stores the messages left for the subscriber. Most VMSs are capable of distinguishing whether an incoming call is a speech call or a facsimile call, but this requires that for each call arriving at the VMS there is an equipment that identifies the incoming call type. The number and costs of the equipments required could be reduced considerably if different types of incoming calls would be directed to the exchange via different lines. In order for the calls to be transferred to the VMS, the called party number Cd# must be the same in the forwarding and therefore different types of calls cannot be distinguished from one another on the basis of analysing the called party number.

BRIEF DESCRIPTION OF THE INVENTION

The object of the invention is to provide a method and equipment implementing the method such that call forwarding in a mobile system can be automatically routed specifically for each basic service. The objects of the invention are achieved with a method according to claim 1, characterized by providing the forwarding exchange with a basic service code, and implementing call routing to the forwarding number according to the basic service code.

The invention also relates to a method according to claim 2 for implementing call forwarding in a mobile system comprising at least a first exchange for carrying out call forwarding on the basis of subscriber data related to the call forwarding, at least one home location register connected to the first exchange for storing the subscriber data related to the call forwarding. The method comprises the steps of receiving at the first exchange a call set-up message addressed to a subscriber in the mobile system, requesting routing information from the home location register, and transmitting a response message from the home location register to the first exchange, the message containing data indicating the call forwarding and a forwarding number. The method is characterized by providing the forwarding exchange with a basic service code indicating the basic service related to the call in connection with the call set-up message or a response message to said routing information request, and implementing call routing to the forwarding number according to said basic service code.

The invention also relates to a method according to claim 4 for implementing call forwarding in a mobile system comprising at least one exchange for carrying out call forwarding on the basis of subscriber data related to the call forwarding, at least one visitor location register for storing the subscriber data related to the call forwarding. The method comprises the steps of receiving at the exchange a call set-up message addressed to a subscriber in the mobile system, providing a subscriber data request to the visitor location register connected to the exchange, and transmitting a response message from the visitor location register to the exchange, the message containing data indicating the call forwarding and a forwarding number. The method is characterized by providing the forwarding exchange with a basic service code in connection with the call set-up message or said response message, and implementing call routing to the forwarding number according to the basic service code.

The invention also relates to a home location register according to claim 5 connected to a first exchange in a mobile system. The home location register is characterized in that it is arranged to transmit a basic service code to the first exchange in connection with a response message to a routing information request, the data indicating the basic service related to the call.

The invention also relates to a first exchange according to claim 7 in a mobile system, comprising means for transferring a call to a forwarding number. The exchange is characterized in that it is arranged to derive a basic service code from the call set-up message or from a response message transmitted by the home location register to the first exchange in response to a subscriber data request, and that the exchange is arranged to route the call to the forwarding number according to the basic service code.

The invention also relates to an exchange according to claim 11 in a mobile system, comprising means for transferring a call to a forwarding number. The exchange is characterized in that the exchange is arranged to derive a basic service code from basic service data that indicates the basic service of the call and that is transmitted in connection with the call set-up message or a response message transmitted from the visitor location register to the exchange in response to a subscriber data request, and that the exchange is arranged to perform routing to the forwarding number according to said basic service code.

The invention is based on providing the forwarding exchange with data by means of which the exchange is able to identify the basic service related to the call, and the exchange uses this data for further routing of the call. The basic service data may be transferred to the exchange during the call set-up, but the data about the call type is substantially transmitted in connection with signalling between the exchanges and the subscriber databases.

The arrangement according to the invention provides several advantages. When incoming calls can be separated automatically, their further routing can be selected in a desired manner. For example in the above-described case, calls arriving at the VMS can be routed from the forwarding exchange to different lines, so that there is no need for equipments identifying the call type. In such a case, the costs for the operator are considerably reduced as the number of equipments required becomes smaller without the occurrence of any difficulties for the user concerning the activation of service forwarding.

The arrangement according to the invention also provides other advantages. The forwarding exchange may modify the forwarding number in accordance with the basic service code, and the calls can therefore be separated later according to the basic service for example via connections that offer different qualities and are correspondingly of different prices.

BRIEF DESCRIPTION OF THE DRAWINGS

The invention will be described in greater detail in connection with preferred embodiments and with reference to the accompanying drawings, in =which FIG. 5 shows an example of an extension according to the invention in a SRI-Res message, FIG. 7 illustrates generally call forwarding data updated in the VLR in connection with a roaming number allocation request.

DETAILED DESCRIPTION OF THE INVENTION

The present invention is applicable for use in mobile systems where circuit switched data and speech calls can be set up. The invention can be especially used in a GSM mobile system and in similar more recent mobile systems, such as the DCS1800 (Digital Communication System) and the PCN (Personal Communication Network). In the following, the primary embodiment of the invention will be described in the GSM system, without restricting the invention thereto, however.

Figure 1:
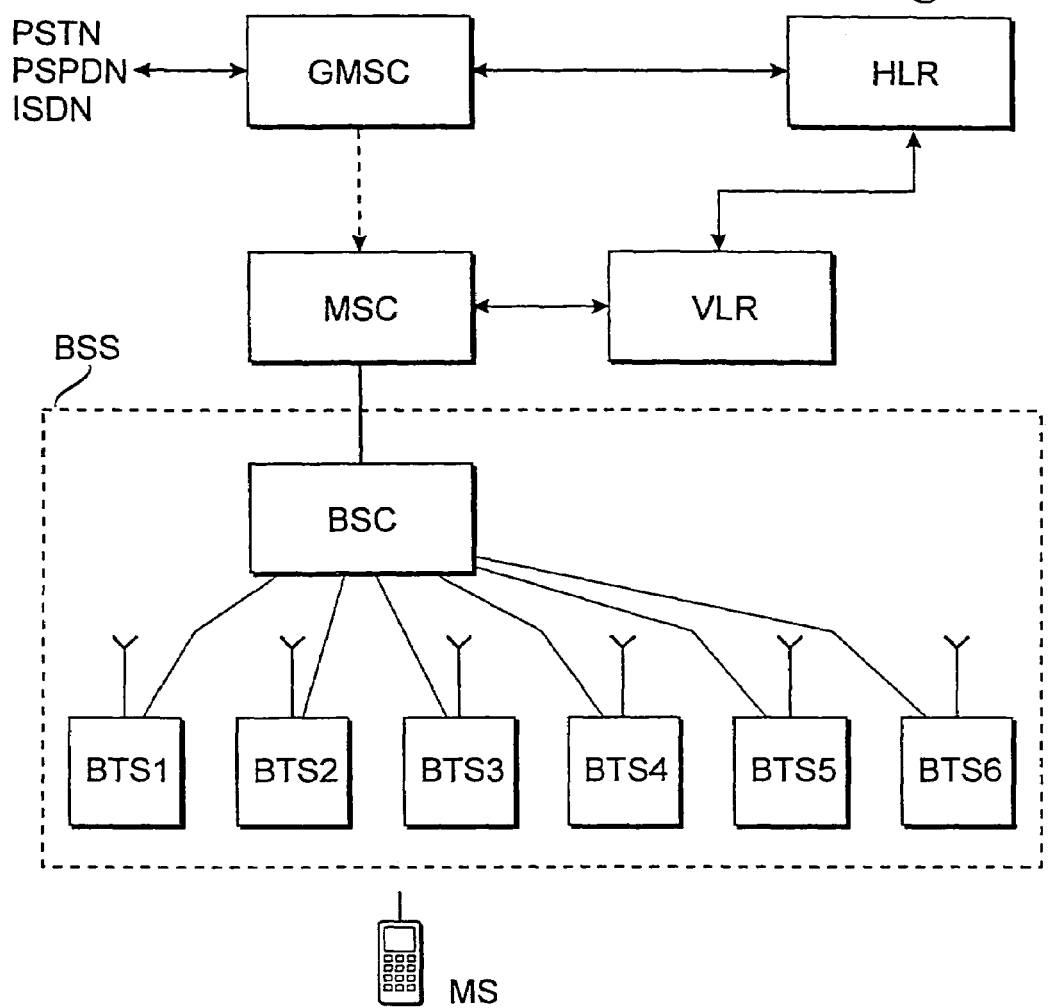
FIG. 1 is a block diagram illustrating the basic components of a GSM system.

FIG. 1 shows the basic components of the GSM system without describing in greater detail their properties or other parts of the system. For a more detailed description of the GSM system, reference is made to the GSM recommendations and *The GSM System for Mobile Communications* by M. Mouly and M. Pautet, Palaiseau, France, 1992, ISBN: 2-9507190-0-0-7.

A mobile services switching centre MSC manages the switching of incoming and outgoing calls. It carries out similar functions as an exchange in a PSTN. In addition, it also performs functions, such as subscriber location management, that are only characteristic of mobile communication in connection with the network subscriber registers. In a GSM system, the subscriber registers include a home location register HLR and a visitor location register VLR. Subscriber data is stored permanently in the home location register HLR, as well as information on the visitor location register VLR in the area of which the MS is located. The visitor location register VLR in turn stores subscriber data of an MS temporarily while the MS is located in the area of the mobile services switching centre MSC connected to the visitor location register VLR. One visitor location register VLR typically serves one mobile services switching centre MSC. The MSs are connected to the mobile services switching centre MSC via base station systems BSS. A base station system BSS is formed of base station controllers BSC and base stations BTS. One base station controller BSC is used to control several base stations BTS.

Figure 2:
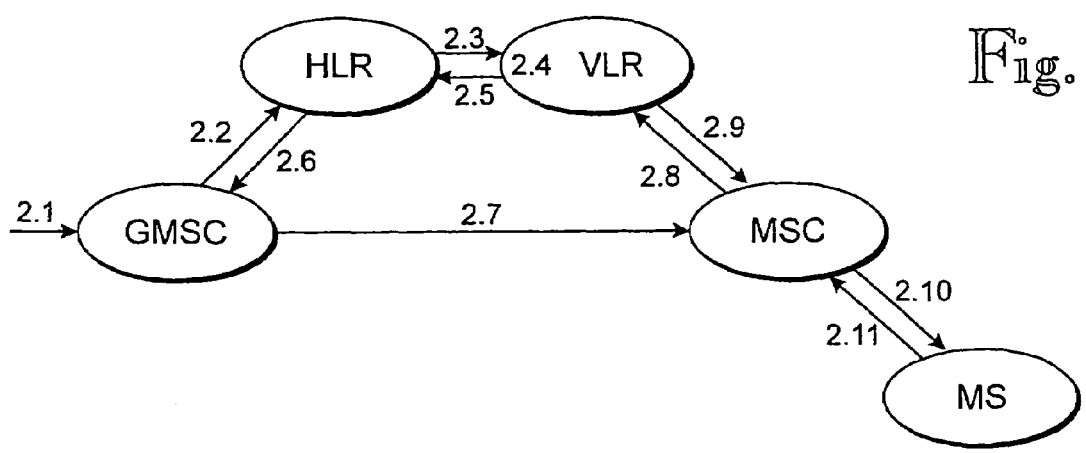
FIG. 2 illustrates the set-up of a call terminating at a mobile station (MS) in a GSM-type mobile system.

FIG. 2 illustrates the formation of a call terminating at a mobile station MS in a GSM-type mobile system utilizing a multi numbering scheme. In step 2.1, a call arrives at a first exchange GMSC of the network, which transmits a routing information request (message 2.2) to the subscriber home location register HLR that is determined according to the subscriber number MSISDN. The routing information request message 2.2 also contains the MSISDN. In location updating, the home location register HLR of the subscriber is provided with updated data about the visitor location register VLR in the area of which the subscriber is located. On the basis of this data, the home location register HLR transmits to the visitor location register VLR a roaming number allocation request (message 2.3). With the roaming number allocation request the visitor location register VLR also receives an international mobile subscriber identity (IMSI) and the BCIE related to the called MSISDN (or the ISDN BCIE that arrived in message 2.2), indicating for example the network resources required by the call but not the type of the basic service. The visitor location register VLR stores the BCIE it has received and allocates a mobile station roaming number (MSRN) (event 2.4). The visitor location register VLR transmits the allocated MSRN to the home location register HLR in a response message 2.5. The home location register HLR in turn forwards the roaming number to the exchange GMSC that requested for the routing information in a message 2.6. The roaming number space is determined such that a call is always directed to the visited MSC the visitor location register VLR of which has allocated the roaming number. Therefore, the gateway exchange GMSC may route the call on the basis of the roaming number by transmitting an initial address message 2.7 to the exchange VMSC indicated by the roaming number.

After the exchange VMSC has received the initial address message 2.7, it finds during the roaming number analysis that the call is about to terminate in its own area and should not be forwarded. In such a case, the exchange VMSC asks for the data of the called subscriber from its own visitor location register VLR for the purpose of call set-up (message 2.8). In a normal situation, the visitor location register VLR returns the required data, including for example the BCIE, in a response message 2.9. If the exchange VMSC is capable of providing the data transmission resources indicated by the BCIE, the call set-up signalling illustrated by arrows 2.10 and 2.11 will be carried out between the exchange VMSC and the mobile station MS.

As described above, modern mobile systems support different tele- and bearer services. The GSM bearer services are determined in the GSM recommendation 02.02 and the teleservices in the GSM recommendation 02.03. A separate teleservice and bearer service code is determined for each teleservice and bearer service in the recommendation 09.02. For example, the teleservice code of the speech service is 00010001 and the teleservice code of the short messages originating from a mobile station is 00100010. In this specification, all service codes are called basic service codes. One mobile subscriber may have access to different tele- and bearer services, which are referred to in this connection as basic services. As described above, it is preferable to use a multi numbering scheme, where each basic service is allocated an individual MSISDN.

Figure 3:
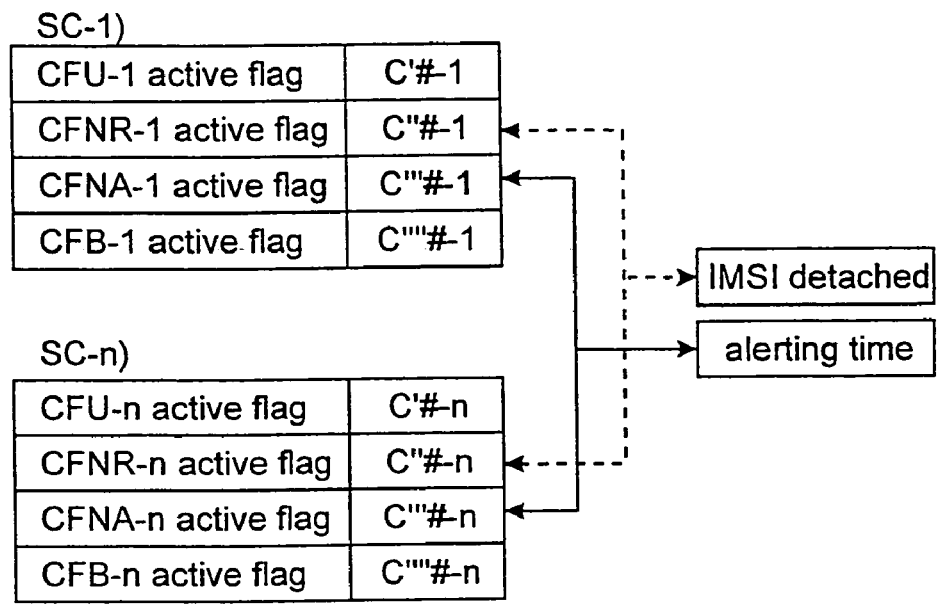
FIG. 3 illustrates the general implementation of subscriber data in a home location register (HLR)

In a GSM system, subscriber services are specified in a subscriber home location register HLR with the other subscriber data. FIG. 3 illustrates the general implementation of subscriber data in the home location register HLR for a subscriber that has access to n basic services. The subscriber has his own IMSI that is used as subscriber identification within the mobile network. The services specified for the subscriber are related to the subscriber IMSI. According to the principle of the multi numbering scheme, each subscriber service 1 to n is provided an individual number MSISDN-1 to MSISDN-n. To each MSISDN is related one basic service code SC-1 to SC-n that determines the service. The basic service code is one of the aforementioned tele- and bearer service codes. Four different call forwarding services can be selected for each basic service, i.e. call forward unconditional (CFU), and the conditional call forwarding types call forward not reached (CFNR), call forward no answer (CFNA) and call forward busy (CFB). The CFNR includes data that the subscriber cannot be reached (IMSI detach) and the CFNA includes information about the alerting time within which the subscriber is to respond to the call.

Figure 4:
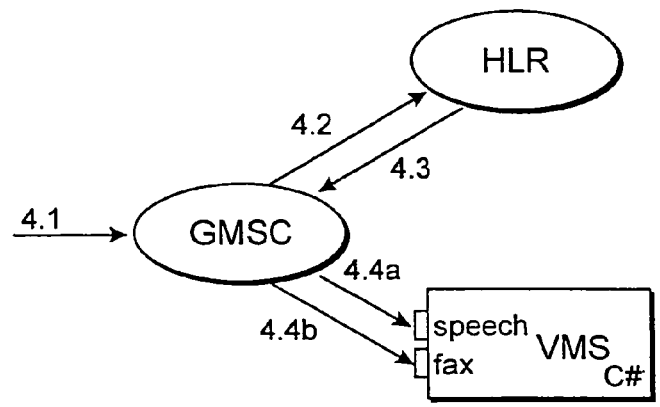
FIG. 4 illustrates the call set-up procedure of a call terminating at an MS, including call forwarding activated by the HLR.

The call set-up procedure of a call terminating at an MS is examined with reference to FIGS. 3 and 4, the procedure including CFU. This type of call forwarding is generally directed via the home location register HLR. Call forwarding is also directed via the home location register HLR if the subscriber cannot be reached and this data is stored in the home location register HLR. In FIG. 4, the call set-up messages and events 4.1 and 4.2 are identical to events 2.1 and 2.2 shown in FIG. 2 above. After the home location register HLR has received the routing information request, it finds the data concerning the call forwarding (CFU flag active) and the forwarding number (C#-n). In a system according to the GSM standards, the home location register HLR returns data about the forwarding subscriber and the forwarding number in a response to the routing information request (event 4.3), but no information on the type of the transferred call.

FIG. 5 shows a response (SendRoutingInfoResE, SRI-Res) to a request for routing information and an example of an extension according to the invention to the aforementioned SRI-Res message (SriResExtension). The message described is not in accordance with the current GSM recommendations, and the extension must also therefore be taken into account in the GMSC that receives the message. In the embodiment described herein, the response message is supplemented with an extension that also returns the basic service code SC-n ([9]basicService) related to the called party number and stored in the HLR to the exchange that made the routing request. According to the invention, the forwarding QMSC identifies the type of the service on the basis of the basic service code and routes the call to the forwarding number C#-n and selects the line according to the basic service code (event 4.4a or 4.4b). For example in the voice mail service described above, the forwarding GMSC guides the speech calls (4.4a) and facsimile calls (4.4b) to the VMS via different lines according to the basic service code.

In a GSM system there is also another subscriber register, the visitor location register VLR, to which some of the subscriber data stored in the home location register HLR is copied when the subscriber is located in the area of the VLR. Conditional call forwarding procedures require data about the subscriber status or the progress of the call set-up, and this data is usually directed via the VLR. In the CFNR, which takes place when the subscriber cannot be reached, the call forwarding is directed via the HLR or the VLR, depending on where the data about the unavailability of the subscriber is stored.

Figure 6:
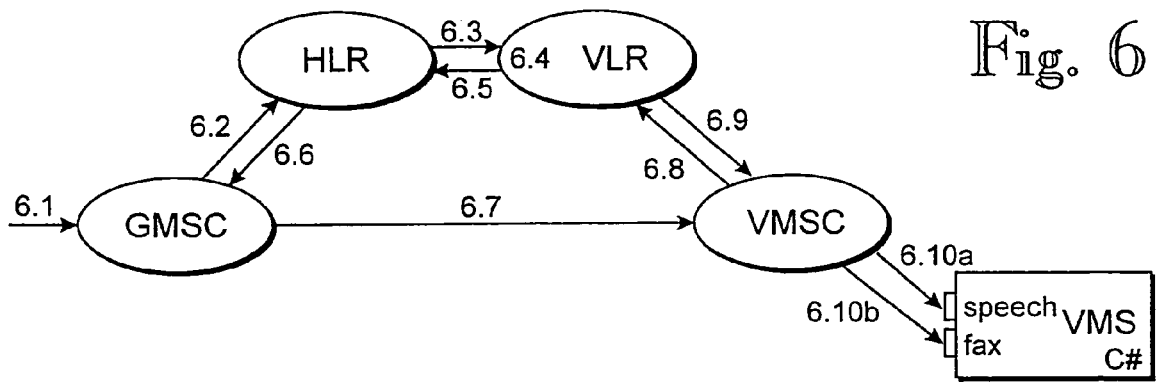
FIG. 6 illustrates the call set-up procedure of a call terminating at an MS, including call forwarding activated by a visitor location register (VLR)

Examine with reference to FIG. 6 the call set-up procedure of a call terminating at an MS, including conditional call forwarding in an exchange VMSC serving the mobile station. In FIG. 6, the call set-up messages and events 6.1 to 6.8 are exactly as described above in connection with FIG. 2. When the visitor location register VLR receives a subscriber data request 6.8 from the exchange VMSC in the case shown in FIG. 6, it detects that the mobile station is busy, for example. The visitor location register VLR next checks from the subscriber data whether the mobile subscriber has activated the conditional call forwarding while the subscriber is busy. The visitor location register VLR detects that the subscriber has such conditional call forwarding to a certain forwarding number (CFB active flag) and it transmits to the exchange VMSC a response message 6.9 commanding the exchange to carry out call forwarding to the given number.

In a GSM mobile system, data about the network requirements, such as transmission rates, number of data and stop bits etc, related to the call is transmitted in a GSM BCIE. In addition to the GSM BCIE, it is possible to use an ISDN BCIE that may arrive with the call set-up message from the fixed network. The ISDN BCIE does not directly contain data about the call type, and therefore information elements HLC (high layer compability) and LLC (low layer compability) are used simultaneously with the ISDN BCIE as the basic service data. The exchange VMSC may receive the basic service data in connection with the call set-up message, but this takes place only in some cases. Such situations include for example calls between mobile stations located in the area of the same exchange, calls between mobile stations when ISDN signalling (ISUP) is used over the entire connection and all the exchanges participating in the connection support the transmission of the basic data, or ISDN calls to a mobile station when ISDN signalling is used over each path and all the exchanges participating in the connection support the transmission of the basic service data. For example, a call set-up message related to data calls arriving from a PSTN rarely contains sufficient basic service data to unambiguously determine the call type.

FIG. 7 illustrates generally the call forwarding data updated in a VLR in a GSM system in connection with location updating. At least the IMSI and the primary MSISDN according to the primary service are transferred from the HLR to the VLR. The primary MSISDN is usually the MSISDN of the speech service. In addition to these, a list of the basic services available to the subscriber and related data, such as activations and forwarding numbers, are updated in the VLR. Since the CFU is directed via the HLR, the data related thereto is not updated in the VLR.

A roaming number allocation request is directed to the visitor location register VLR on the basis of the IMSI and it contains the BCIE related to the called party number MSISDN in the home location register. The basic service data is transmitted from the visitor location register VLR to the exchange VMSC in a response 6.9 to the service data request according to the prior art.

In the arrangement according to the invention, when the forwarding VMSC obtains data about the call forwarding and the forwarding number from the subscriber database, substantially from the VLR, it forms the basic service code on the basis of the basic service data that is either received in the call set-up message or forwarded in the signalling between the exchange and the subscriber database, substantially in the response to the subscriber data request. This is a normal function of the VMSC that takes place substantially on the basis of the BCIE. In the following, a few examples are given concerning how a conversion can be carried out. For example, if the information transfer capability (ITC) value of the BCIE in octet 3 is 000 (bits 1, 2 and 3), the basic service code may be the speech service (telephone) =00010001. If the ITC value of the BCIE is 011, the basic service code will be the automatic facsimile group 3=01100010. The above-described analyses and conversions are only examples. In practice, a conversion can be carried out by means of any suitable analysis.

After the exchange VMSC has formed the basic service code, it routes the call to the forwarding number C#-n according to the basic service code (event 6.10). For example in the above-described case of the voice mail service, the forwarding exchange GMSC guides the speech calls (6.10*a*) and facsimile calls (6.10*b*) to the VMS along different lines by means of the basic service code.

Figure 8:
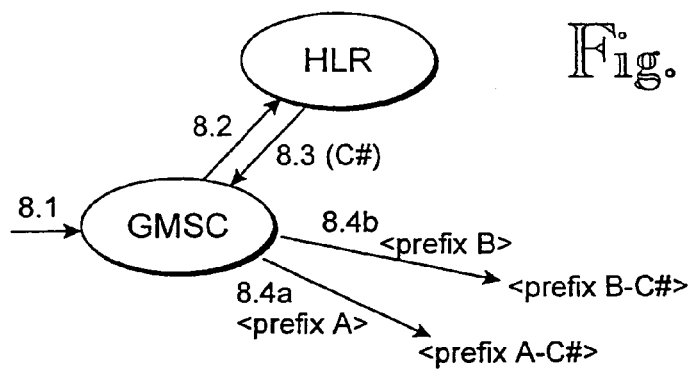
FIG. 8 illustrates an example of utilizing a basic service code.

Examine another example of the use of the basic service code in the routing of call forwarding in a situation, described with reference to FIG. 8, where a GSM subscriber transfers calls abroad. The subscriber can use two network connections which are distinguished from one another by a prefix and one of which provides a cheaper connection of less good quality and the other one provides a good quality connection that is more expensive. It would be advantageous for the subscriber if the incoming speech calls could be automatically directed via the cheaper network connection and the good quality connection could be used to transmit facsimiles. According to the prior art, a subscriber is not able to select the network of a transferred call specifically for each basic service, since the home location register HLR stores the forwarding number in the form <country code-subscriber number>, nature of address indicator=international, and not for example in the form <prefix-country code-network indicator-subscriber number>. Also, the type of an analogue call arriving from a PSTN can only be analyzed in the home location register HLR on the basis of the MSISDN. By means of the arrangement according to the invention, the forwarding exchange GMSC receives data about the basic service of the incoming call in the form of the basic service code. If the exchange is determined to add before the forwarding number a prefix that indicates the network connection and that is selected according to the basic service code, the transferred call is automatically routed via the connection that is determined to be the most suitable for the call type.

The above-described routing examples only illustrate the possibilities of utilizing the arrangement according to the invention, but the invention is not restricted to these examples, however. The routing of calls separated according to the basic service can be selected specifically for each application.

Figure 9:
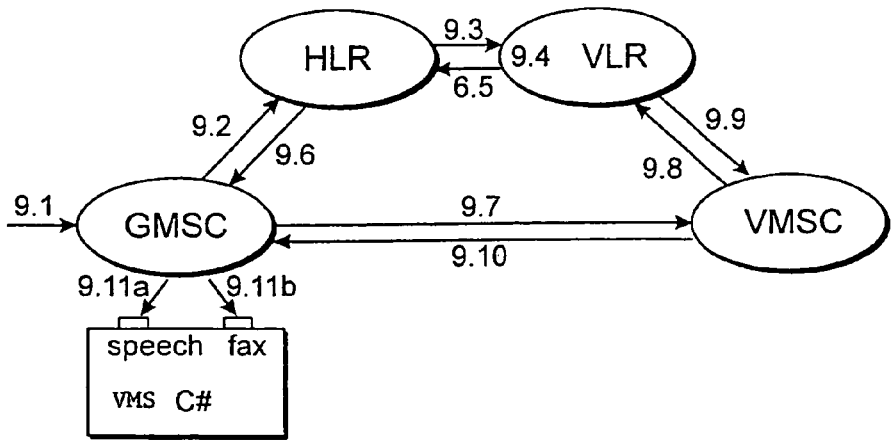
FIG. 9 illustrates conditional call forwarding in a network supporting optimal routing.

The method according to the invention is also applicable for use in networks which use optimal routing. FIG. 9 illustrates conditional call forwarding in a network supporting optimal routing. In FIG. 9, the call set-up messages and events 9.1 to 9.9 are mainly similar to events 6.1 to 6.9 described above in connection with FIG. 6. The home location register HLR transmits the basic service code to the gateway exchange GMSC in an extended response message to the routing information request. The call set-up proceeds as described above until the exchange VMSC obtains data about the call forwarding and the forwarding number from the visitor location register VLR in event 9.9. The exchange VMSC then returns the call to the gateway exchange GMSC (event 9.10) according to the optimal routing, and the exchange GMSC carries out the transfer to the forwarding number by selecting the forward routing for example in the above-described manner on the basis of the basic service code obtained in the response to the routing information request (9.11*a* or 9.11*b*).

Figure 10:
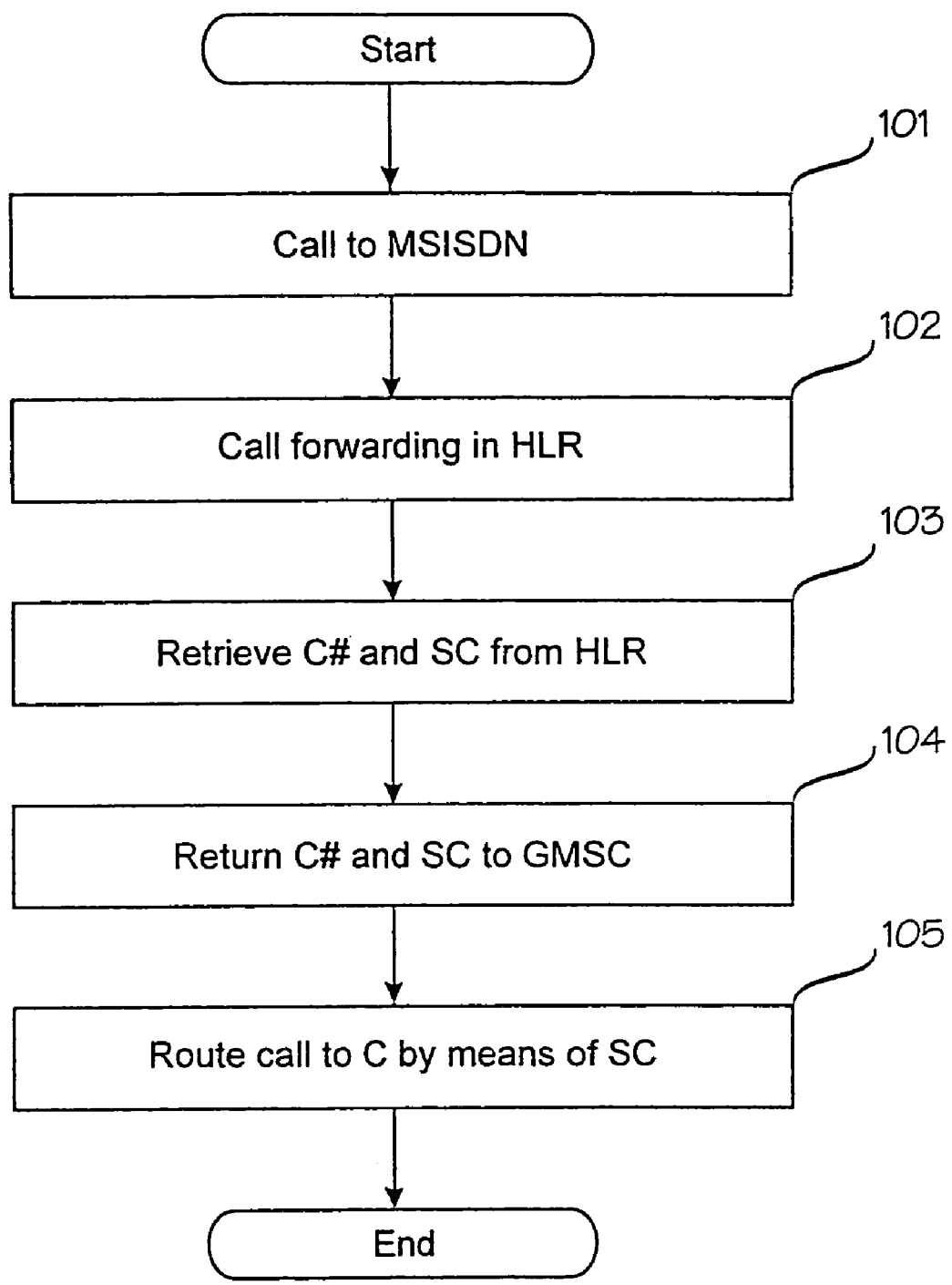
FIG. 10 is a flow chart illustrating a method according to the invention in case of call forwarding directed via the HLR.

The flow chart of FIG. 10 illustrates a method according to the invention in case of call forwarding directed via the HLR. In step 101, the GMSC receives a call addressed to an MS to a number MSISDN. It is detected in connection with the routing information request that the subscriber has specified unconditional call forwarding (step 102). The HLR retrieves the basic service code SC corresponding to the MSISDN and the forwarding number C# (step 103) and returns them to the GMSC in step 104. After the GMSC has received data about the call forwarding, it receives the basic service code SC related to the call and routes the call to the forwarding number C# in the manner indicated by the basic service code.

Figure 11:
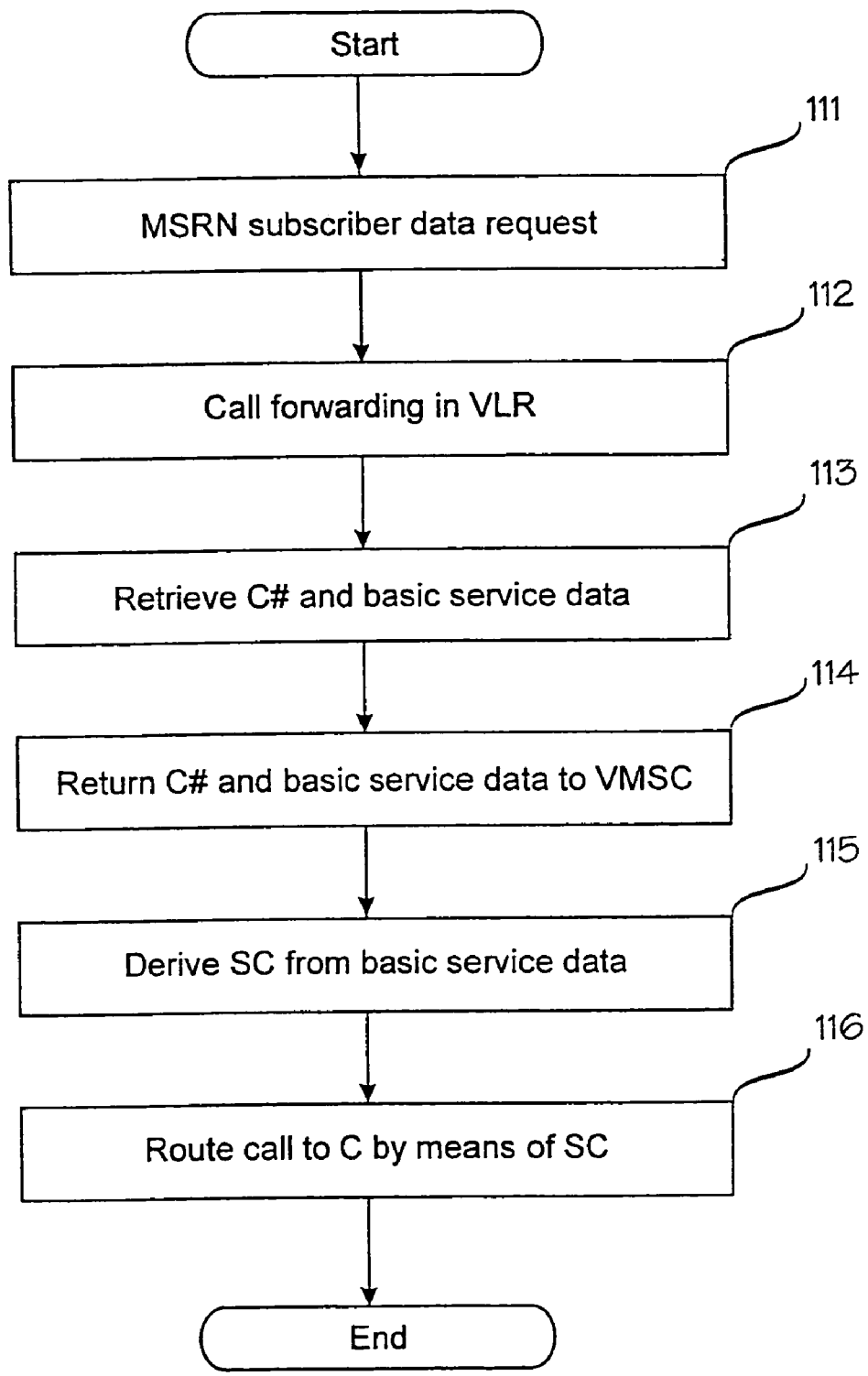
FIG. 11 is a flow chart illustrating a method according to the invention in case of call forwarding directed via the VLR.

The flow chart of FIG. 11 illustrates the method correspondingly in case of call forwarding directed via the VLR when the call set-up has proceeded to the VMSC as shown in FIG. 2 (events 2.1 to 2.7). After the VMSC has received the call set-up message and detected that it terminates at its own service area, the VMSC transmits a subscriber data request concerning the MSRN to the VLR (step 111). The VLR detects the call forwarding (step 112), retrieves the basic service data corresponding to the MSRN and updated with the roaming number allocation request (step 113) and transmits them to the forwarding VMSC (step 114) in the response message to the subscriber data request. After the VMSC has received the response message, it separates from the message the basic service data transmitted by the VLR and forms a basic service code SC on the basis of this data (step 115). The VMSC thereafter routes the call to the forwarding number C# in the manner indicated by the basic service code (step 116).

It is obvious for a person skilled in the art that as the technology develops the basic idea of the invention can be implemented in several different manners. The invention and the embodiments thereof are therefore not restricted to the above-described examples, but they may vary within the scope of the claims. Even though the invention is described above in connection with a GSM-type mobile system, the invention can also be applied in other similar mobile systems.

The invention claimed is:

1. A method for implementing call forwarding in a mobile system comprising at least one forwarding exchange for carrying out call forwarding via one of several alternative types of lines on the basis of subscriber data related to the call forwarding, each type of line having different qualities, and at least one subscriber database for storing the subscriber data related to the call forwarding, the method comprising:

receiving at the forwarding exchange a call set-up message addressed to a subscriber in the mobile system;
performing a subscriber data request to the subscriber database;
transmitting a response message from the subscriber database to the forwarding exchange, the message comprising data indicating the call forwarding, a forwarding number and the basic service code, the basic service code indicating the necessary properties of the line which should be selected; and
implementing call routing to the forwarding number by selecting one of said alternative types of lines based on the basic service code.

2. A method for implementing call forwarding in a mobile system comprising at least a first exchange for carrying out call forwarding via one of several alternative types of lines on the basis of subscriber data related to the call forwarding and at least one home location register connected to the first exchange for storing the subscriber data related to the call forwarding, each type of line having different qualities, the method comprising:

receiving at the first exchange a call set-up message addressed to a subscriber in the mobile system;
requesting routing information from the home location register;
transmitting a response message from the home location register to the first exchange, the message comprising data indicating the call forwarding, a forwarding number, and a basic service code indicating the basic service related to the call, and the necessary properties of the line which should be selected; and
implementing call routing to the forwarding number by selecting one of said alternative types of lines based on said basic service code.

3. A method according to claim 2, wherein the basic service code is forwarded from the home location register to the first exchange via an extension added to the response message Send_Routing_Info_-RES to the routing information request.

4. A method for implementing call forwarding in a mobile system comprising at least one exchange for carrying out call forwarding via one of several alternative types of lines on the basis of subscriber data related to the call forwarding and at least one visitor location register for storing the subscriber data related to the call forwarding, each type of line having different qualities, the method comprising:

receiving at the exchange a call set-up message addressed to a subscriber in the mobile system;
providing a subscriber data request to the visitor location register connected to the exchange;
transmitting a response message from the visitor location register to the exchange, the message comprising data indicating the call forwarding, a forwarding number and a basic service code, the basic service code indicating the necessary properties of the line which should be selected; and
implementing call routing to the forwarding number by selecting one of said alternative types of lines based on the basic service code.

5. A home location register connected to a first exchange in a mobile system, wherein the home location register is arranged to transmit a basic service code to the first exchange in connection with a response message to a routing information request, the basic service code indicating the necessary properties of the line which should be selected from several alternative types of lines having different properties in routing the call.

6. A home location register according to claim 5, wherein the home location register is arranged to forward the basic service code to the first exchange by means of an extension added to the response message Send_Routing_Info_RES to the routing information request.

7. A first exchange in a mobile system, comprising means for transferring a call to a forwarding number via one of several alternative types of lines, each type of line having different qualities, wherein the exchange is arranged to derive a basic service code from the call-set up message or from a response message transmitted by the home location register to the first exchange in response to a subscriber data request, the basic service code indicating the necessary properties of the line which should be selected; and the exchange is arranged to route the call to the forwarding number by selecting one of said alternative types of lines based on the basic service code.

8. An exchange according to claim 7, wherein the exchange is arranged to receive the basic service code in an extension added to the response message Send_Routing_Info_RES to the routing information request.

9. An exchange according to claim 7, wherein said forwarding number is the number of a Voice Mail Service center having several lines, and that said exchange is arranged to transfer the call to the Voice Mail Service center via a line selected for the transfer according to the basic service code.

10. An exchange according to claim 7, wherein the exchange is arranged to subject the forwarding number to a conversion selected according to the basic service code.

11. An exchange in a mobile system, comprising means for transferring a call to a forwarding number via one of several alternative types of lines, each type of line having different qualities, wherein the exchange is arranged to derive a basic service code from basic service data that indicates the basic service of the call and that is transmitted in connection with the call set-up message or a response message transmitted from the visitor location register to the exchange in response to a subscriber data request, the basic service code indicating the necessary properties of the line which should be selected, and the exchange is arranged to perform routing to the forwarding number by selecting one of said alternative types of lines based on said basic service code.

12. An exchange according to claim 11, wherein the exchange is arranged to derive the basic service code at least on the basis of the bearer capability information element contained in the basic service data.

13. An exchange according to claim 11, wherein said forwarding number is the number of a Voice Mail Service center having several lines, and that said exchange is arranged to transfer the call to the Voice Mail Service center via a line selected for the transfer according to the basic service code.

14. An exchange according to claim 11, wherein the exchange is arranged to subject the forwarding number to a conversion selected according to the basic service code.

15. A method according to claim 1, wherein the basic service includes different call types for the subscriber and wherein the different call types have a single called party number.

16. A method according to claim 2, wherein the basic service includes different call types for the subscriber and wherein the different call types have a single called party number.

17. A method according to claim 4, wherein the basic service code indicates a basic service including different call types for the subscriber related to the call and wherein the different call types have a single called party number.

18. A first exchange according to claim 7, wherein the basic service code indicates a basic service including different call types for a subscriber related to the call and wherein the different call types have a single called party number.

19. An exchange according to claim 11, wherein the basic service includes different call types for a subscriber related to the call and wherein the different call types have a single called party number.

20. A home location register according to claim 5, wherein the basic service code further indicates a basic service including different call types for the subscriber related to the call and wherein the different call types have a single called party number.

21. A home location register according to claim 5, wherein the necessary properties include at least one of line quality, line capacity and line cost.

22. A method according to claim 1, wherein the selecting of the alternative types of lines is based on at least one of line quality, line capacity and line cost.

* * * * *